United States Patent
Gschwender

(10) Patent No.: US 12,492,771 B2
(45) Date of Patent: Dec. 9, 2025

(54) COMPRESSOR FOR A DEVICE FOR SEALING PNEUMATIC TIRES BY MEANS OF A SEALING LIQUID

(71) Applicant: Aircom Automotive Sp. z o.o. Sp. k., Pietrzykowice (PL)

(72) Inventor: Dominik Gschwender, Steckborn (CH)

(73) Assignee: AIRCOM AUTOMOTIVE SP. Z O.O. SP. K., Pietrzykowice (PL)

( * ) Notice: Subject to any disclaimer, the term of this patent is extended or adjusted under 35 U.S.C. 154(b) by 0 days.

(21) Appl. No.: 18/692,525

(22) PCT Filed: Sep. 15, 2022

(86) PCT No.: PCT/EP2022/075594
§ 371 (c)(1),
(2) Date: Mar. 15, 2024

(87) PCT Pub. No.: WO2023/041617
PCT Pub. Date: Mar. 23, 2023

(65) Prior Publication Data
US 2024/0384821 A1   Nov. 21, 2024

(30) Foreign Application Priority Data
Sep. 17, 2021   (DE) ..................... 10 2021 124 118.9

(51) Int. Cl.
*F16L 37/248*   (2006.01)
*B29C 73/16*   (2006.01)
(52) U.S. Cl.
CPC .......... *F16L 37/248* (2013.01); *B29C 73/166* (2013.01)

(58) Field of Classification Search
CPC ........ F16L 37/248; F16L 5/027; B29C 73/166
See application file for complete search history.

(56) References Cited

U.S. PATENT DOCUMENTS 6,669,239 B1 *   12/2003   Entringer ................ F16L 5/027
8,251,105 B2   8/2012   Lolli et al.
(Continued)

FOREIGN PATENT DOCUMENTS

DE   10 2005 019 766 A1   11/2006
DE   20 2013 004 176 U1   8/2014
(Continued)

OTHER PUBLICATIONS

International Search Report for PCT/EP2022/075594 dated Jan. 30, 2023 with English Translation.
(Continued)

*Primary Examiner* — Zachary T Dragicevich
(74) *Attorney, Agent, or Firm* — CARTER, DELUCA & FARRELL LLP

(57) ABSTRACT

A compressor for a device for sealing pneumatic tires by means of a sealing liquid includes a first bayonet portion and a second bayonet portion. The first bayonet portion includes an air outlet port which is adapted such that it can be coupled to a second bayonet portion with an air inlet port of a sealing liquid container of the device so that the first bayonet portion and the second bayonet portion form a bayonet lock and the air inlet port is connected to the air outlet port. The compressor comprises a first clamping portion adapted to clamp the second bayonet portion in the bayonet lock.

12 Claims, 8 Drawing Sheets

(56) References Cited

U.S. PATENT DOCUMENTS

2008/0092984 A1* 4/2008 Marini .................. B29C 73/166
2020/0355309 A1* 11/2020 Lam ...................... B29C 73/166
2021/0276289 A1 9/2021 Gschwender et al.

FOREIGN PATENT DOCUMENTS

DE 10 2015 009 090 A1 1/2017
WO 2020015826 A1 1/2020

OTHER PUBLICATIONS

Written Opinion for PCT/EP2022/075594 dated Jan. 30, 2023 with English Translation.
German Search Report for 10 2021 124 118.9 dated Dec. 16, 2021 with English translation.

* cited by examiner

COMPRESSOR FOR A DEVICE FOR SEALING PNEUMATIC TIRES BY MEANS OF A SEALING LIQUID

The invention relates to a compressor for a device for sealing pneumatic tires by means of a sealing liquid. The compressor has a first bayonet portion with an air outlet port, which first bayonet portion is adapted to be coupled to a second bayonet portion with an air inlet port of a sealing liquid container of the device so that the first bayonet portion and the second bayonet portion form a bayonet lock and the air inlet port is connected to the air outlet port. The invention also relates to the device for sealing pneumatic tires by means of a sealing liquid, which device comprises the compressor and a sealing liquid container.

Tire sealants have been used in pneumatic tires for a long time since the use of spare tires no longer appears to be as profitable and expedient as it used to be, for reasons of space but also due to the infrequent damage to tires. These tire sealants are normally intended for the short-term repair of tire emergencies where a hole, a tear or, generally speaking, an opening occurs in a tread and wall of a tire. Conventional tire sealants are based on a latex-rubber base substance. They form a rubber-like mass in the tire. The tire sealant is inserted through the tire valve and temporarily closes the hole or opening. The tire is then replaced later.

Substantially two systems are known for the application, namely, on the one hand, a "standard system" in which a sealing liquid can be provided in a compressible container, such as a compressible plastic bottle or a bag, and the sealing liquid is manually pressed into the tire by compressing the compressible container. The sealing is then carried out both mechanically by "plugging" and by coagulation in the opening, with the assistance of a chemical reaction of the sealing liquid. The container is connected to the tire valve via a hose. Subsequent inflation of the tire and the rotating and flexing movement while driving further strengthen the sealing effect.

On the other hand, so-called "comfort systems" are known, to which the present invention belongs and in which the sealing liquid container is connected to a compressor, which can, for example, be operated via a connection in the vehicle. The sealing liquid is then carried along by the air flow and brought to the damaged part. The sealing then takes place as described.

A kit for repairing and inflating inflatable articles is known from EP2029348B1. In this case, a compressor assembly is fluidically and mechanically connected by means of a click-on connection means to a container assembly containing sealing liquid. The production of the click-on connection means is complex and correspondingly cost-intensive. Furthermore, when producing the fluidic and mechanical connection between the compressor assembly and the container assembly, the click-on connection means can easily be damaged, for example break. The kit can then no longer be used or can at least no longer be used in a correct and operationally reliable manner.

The invention is based on the object of providing a compressor and a device that avoid the mentioned problems and in particular enable a simple-to-produce and operationally reliable fluidic and mechanical connection between the compressor and the sealing liquid container.

On the one hand, this object is achieved by a compressor having the features of claim 1. Accordingly, the compressor is designed according to the type mentioned at the outset and has a first clamping portion, which is adapted to clamp the second bayonet portion in the formed bayonet lock.

In the assembled device, or with the bayonet lock formed between the two bayonet portions so that the compressor and the sealing liquid container are fluidically and mechanically coupled to one another, the first clamping portion thus exerts a clamping force on the second bayonet portion. The first clamping portion can cause a friction torque on the second bayonet portion, which leads to a force-fitting fastening. As a result, the first clamping portion ensures an additional securing of the bayonet lock. In addition, the clamping force of the first clamping portion that begins when the sealing liquid container is screwed with the first bayonet portion into the second bayonet portion of the compressor gives the user a feeling of safety that a firm coupling is achieved and the device can be used in an operationally reliable manner.

A bayonet lock is understood to be a mechanical connection that can be produced between the bayonet portions and released again. The bayonet portions can in particular have cylindrical shapes. The bayonet portions are connected to one another and relative to one another by plugging them into one another and rotating them in opposite directions and can also be separated from one another again in reverse order if required. The fluidic and mechanical coupling of the compressor to the sealing liquid container takes place accordingly by a plugging movement and a subsequent rotating movement.

The first clamping portion can be designed as a part or portion of a housing of the compressor. Advantageously, the known sealing liquid containers with the first bayonet portion do not have to be modified, since the first clamping portion of the compressor ensures the additional securing.

It can be provided that the first clamping portion is adapted to radially clamp the second bayonet portion in the formed bayonet lock. For this purpose, the first clamping portion can be formed circumferentially, in particular cylindrically, at least in portions. This is in particular advantageous if the second bayonet portion has a cylindrical shape. As a result, the second bayonet portion can be secured circumferentially and thus particularly securely by means of the first clamping portion.

It can also be provided that the first clamping portion is formed on a cylindrical seat within the compressor. The cylindrical seat can be designed as a depression of a housing of the compressor. The first bayonet portion can be arranged within, in particular in the center of, the cylindrical seat.

The cylindrical seat can thus ensure that the sealing liquid container, which is securely coupled to the compressor by means of the bayonet lock formed, sits firmly in the compressor.

In addition, it can be provided that the first clamping portion is formed by at least two opposing first walls, which are dimensioned such that, in the formed bayonet lock, the second bayonet portion is clamped between the two first walls. The at least two opposing first walls of the first clamping portion can also be referred to as a pair of first walls. It is also possible for two pairs of opposing first walls to form the first clamping portion, which walls are dimensioned such that, in the formed bayonet lock, the second bayonet portion is clamped between the pairs of first walls. The dimensioning of the opposing first walls for clamping the second bayonet portion can in particular take place by providing a clear distance between the opposing first walls that corresponds to the second bayonet portion for clamping. The clear distance can accordingly be equal to or smaller than the width or the diameter of the second bayonet portion, which is clamped between the opposing first walls. It is not necessary for the first walls to have a uniform clear distance or to have a uniform wall thickness. Instead, the wall thickness of the first walls can increase in the direction of rotation of the bayonet lock or the clear distance between the opposing first walls can decrease in the direction of rotation of the bayonet lock. In such an embodiment, the first walls can also be referred to as, for example, linear ramps, which increase in the direction of rotation of the bayonet lock. When the bayonet lock is formed, an increasingly firmer clamping can be achieved by the increasing rotating movement of the sealing liquid container.

Furthermore, it can be provided that the at least two first walls are separated from one another by means of second walls, which in particular do not clamp the second bayonet portion in the bayonet lock formed. The second walls are in particular dimensioned such that they do not clamp the second bayonet portion. The clear distance between the second walls can thus be equal to or greater than the width or the diameter of the second bayonet portion. As a result, the plugging movement for forming the bayonet lock can take place along the second walls, without the plugging movement or the subsequent rotating movement being impaired by the second walls.

In addition, it can be provided that two each of the first walls and of the second walls are in each case separated from one another by slots. This gives the first walls and second walls a flexibility for plugging in the second bayonet portion, for the clamping effect, and thus finally for the formation of the bayonet lock. The first walls and the second walls can in particular form the previously mentioned cylindrical seat in the compressor. The first walls and/or the second walls can also be provided with stiffening elements, for example in the form of stiffening ribs. These can be arranged on the rear side of the first walls and/or of the second walls. Due to the stiffening elements, despite the slots and the flexibility enabled thereby, the required force can be passed by the compressor to the first walls and thus to the second bayonet portion in order to ensure the desired clamping.

Finally, it can also be provided that the first bayonet portion is formed as a cylindrical receptacle of the second bayonet portion and with radially projecting bayonet elements. The radially projecting bayonet elements can engage in corresponding first recesses of the second bayonet portion in order to form the bayonet lock. In this embodiment, the second bayonet portion can be plugged onto the first bayonet portion or the cylindrical receptacle formed thereby. The bayonet lock is then enabled by the already mentioned rotating movement and the engagement of the bayonet elements in the first recesses, as explained in more detail below.

The object mentioned at the outset is, on the other hand, achieved by a device for sealing pneumatic tires by means of a sealing liquid. For this purpose, the device has the above-explained compressor and the sealing liquid container with the second bayonet portion. The latter can in particular be present in a non-assembled or non-coupled state or in a state coupled to one another by means of the bayonet lock formed.

It can be provided that the first bayonet portion and the second bayonet portion form the bayonet lock, the air inlet port is connected to the air outlet port, and the first clamping portion clamps the second bayonet portion in the bayonet lock formed. This assembled state of the device, which can alternatively also be referred to as a kit for sealing pneumatic tires by means of a sealing liquid, in which kit the compressor and the sealing liquid container are coupled to one another, is simple to produce and enables operationally reliable sealing of a damaged pneumatic tire by means of the sealing liquid in the sealing liquid container, as described at the outset with regard to the functional principle thereof.

It can also be provided that the second bayonet portion has a second clamping portion corresponding to the first clamping portion, which second clamping portion is formed by at least one radial projection of the second bayonet portion. The latter can be designed in the shape of a ramp like the first wall, as an alternative or in addition thereto. As a result, the clamping effect can be improved or the clamping force applied by the second bayonet portion and thus by the compressor, in particular by the already mentioned housing of the compressor, can be increased since the second clamping portion protrudes toward the first clamping portion.

Furthermore, in an embodiment of the compressor in which the first bayonet portion is formed as a cylindrical receptacle of the second bayonet portion and with radially projecting bayonet elements, the second bayonet portion can be formed by a cylindrical neck of the sealing liquid container with first recesses running in the circumferential direction of the neck and second recesses running in the longitudinal direction of the neck, for the bayonet elements. During the production of the bayonet lock, the bayonet elements can thus simply be guided axially through the second recesses during the plugging movement. The second recesses can be connected to or engage in the first recesses. As a result, the bayonet elements can finally arrive in or be received by the first recesses. By means of the rotating movement during the production of the bayonet lock, the bayonet elements can finally be guided along the first recesses or in the circumferential direction of the neck to an end position of the bayonet elements within the first recesses. The end position can definitely position, in particular clamp, the bayonet elements within the first recesses.

In this case, it can be provided that the first recesses are designed as elongated holes and/or the second recesses are designed as grooves. The elongated holes can be manufactured in a particularly simple manner, while the grooves do not influence the structural integrity of the second bayonet portion or at most do so to an insignificant extent.

In addition, it can be provided that the first recesses have a ramp-shaped profile along the circumferential direction from a receiving portion of the second bayonet portion for receiving the bayonet elements to a third clamping portion of the second bayonet portion for clamping the bayonet elements in the first recesses. The receiving portion can be formed closer to an end of the second bayonet portion, in particular of the cylindrical neck of the sealing liquid container, than the third clamping portion. In other words, the ramp-shaped profile can increase away from one end of the second bayonet portion or can increase in the height direction of the sealing liquid container. This can achieve the effect that, during the rotating movement, the bayonet elements, following the ramp-shaped profile, press the second bayonet portion or neck of the sealing liquid container downward, as a result of which an increasing torque is required for the rotating movement. This and the clamping force result in the bayonet lock being particularly operationally reliable. For the opposite rotating movement of the bayonet elements, a relatively high torque is then necessary in order to release the bayonet lock again so that an accidental release of the bayonet lock is avoided.

In this case, it can be provided that the third clamping portion has surfaces of increased roughness, in particular with at least a mean roughness value of Ra8 or R9, which clamp the bayonet elements. This further increases the required torque for releasing the bayonet lock in order to prevent an accidental release of the bayonet lock.

Finally, it can be provided that the ramp-shaped profile from the receiving portion to the third clamping portion is stepless. In other words, the ramp-shaped profile can have a slope only in one direction and possibly be designed to taper off.

A possible exemplary embodiment of the invention, which can be taken from the aforementioned and further features, also results from the following drawings and the description in this respect. This exemplary embodiment is explained in more detail below. In the drawings.

Identical elements in FIGS. 1 to 8 are denoted by the same reference signs. If identical elements are present more than once in one of FIGS. 1 to 8, the elements are additionally numbered consecutively, with the consecutive numbering being separated by a point from the reference sign.

Figure 1:
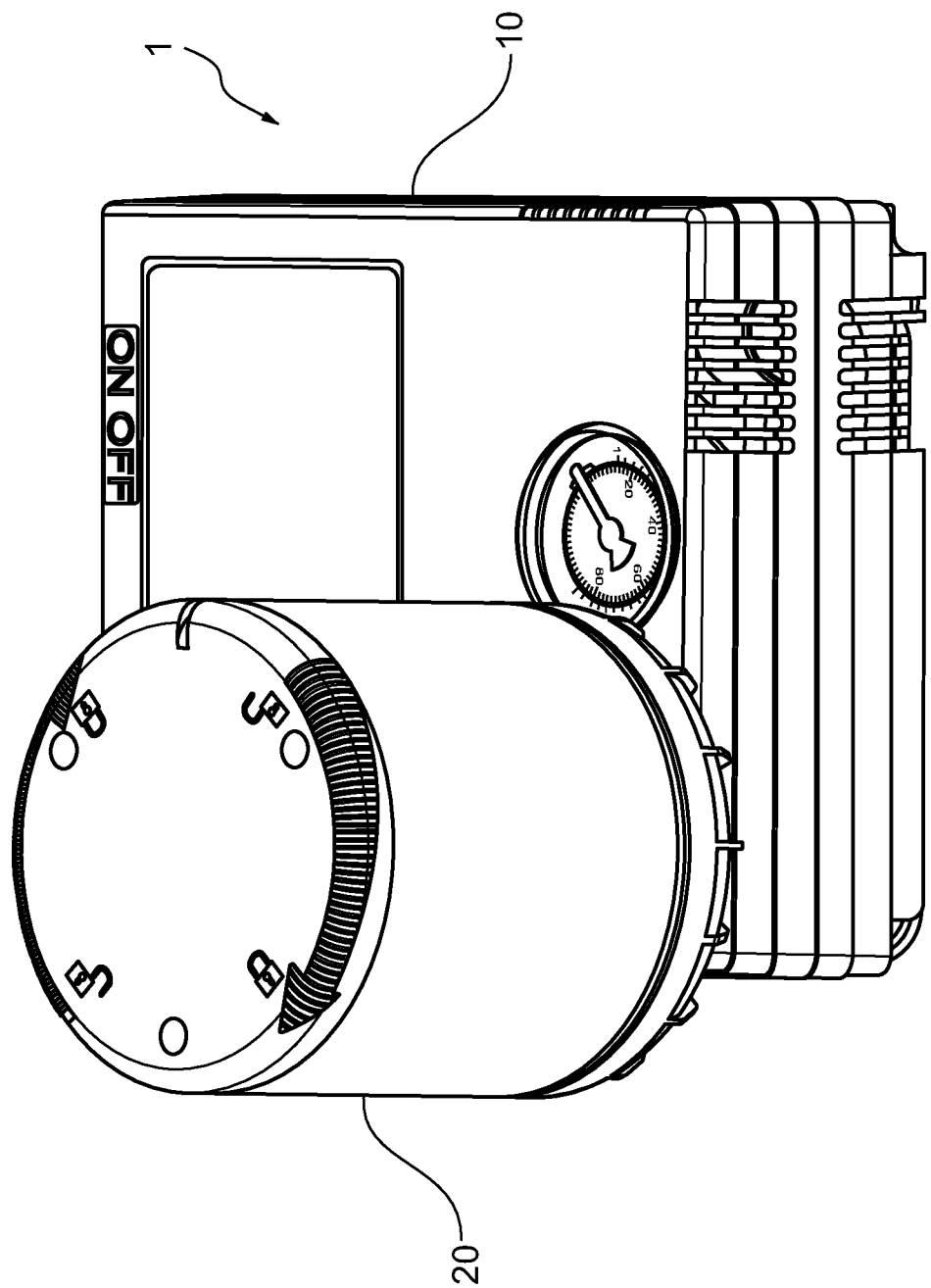
FIG. 1 shows a device for sealing pneumatic tires by means of a sealing liquid in an assembled state.

FIG. 1 shows a device 1 with a compressor 10 and a sealing liquid container 20, which contains a sealing liquid for sealing a damaged pneumatic tire. In the representation shown in FIG. 1, the compressor 10 and the sealing liquid container 20 are coupled to one another by means of a bayonet lock, as explained in more detail below. The compressor 10 and the sealing liquid container 20 are thereby assembled together. The device 1 can thus alternatively also be referred to as a kit. Since the sealing liquid container 20 is plugged onto the compressor 10, a particularly compact device 1 is achieved.

As shown in FIG. 1 by means of the markings on the sealing liquid container 20, an unlocked state (open lock as symbol) and locked state (closed lock as symbol) of the sealing liquid container 20 exist. The sealing liquid container 20 is brought from the unlocked state into the locked state by a rotating movement in the arrow direction shown, as explained in more detail below. Locking is achieved by the formation of a bayonet lock, while unlocking is achieved by releasing this bayonet lock, as explained in more detail below.

Figure 2:
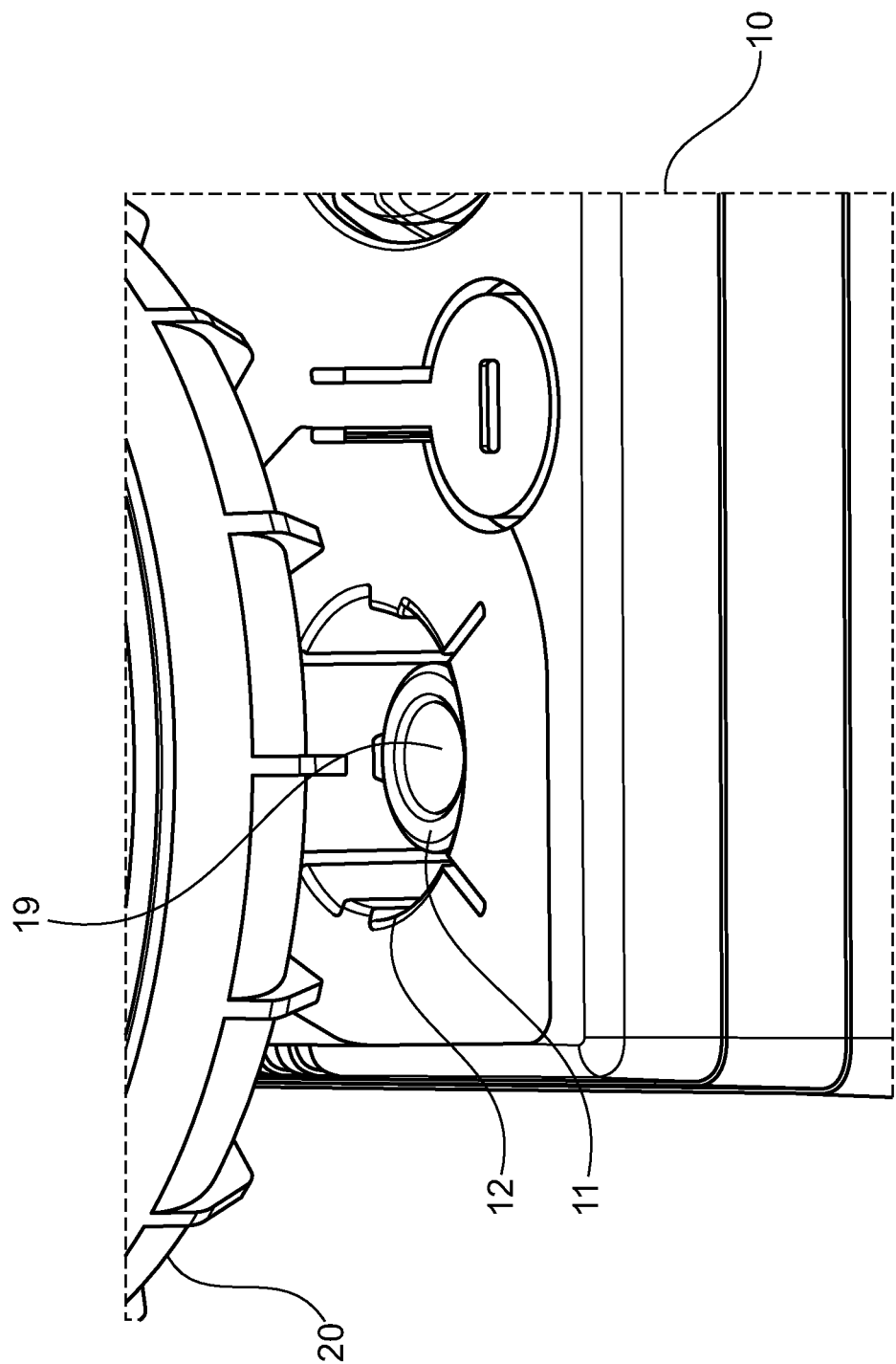
FIG. 2 shows a detailed view of a step of assembling the device or of coupling the compressor to the sealing liquid container of the device of FIG. 1.

FIG. 2 shows, in a non-assembled state or uncoupled state of the compressor 10 and the sealing liquid container 20, that, before the rotating movement for locking or securely fixing the sealing liquid container 20 to the compressor 10, which can be referred to as a second step, a first step has to take place, which takes place by a plugging movement or plug-on movement of the sealing liquid container 20 into or onto the compressor 10. In particular, a second bayonet portion 21 (see FIG. 3) is plugged or inserted into a cylindrical seat 12 of the compressor 10. The cylindrical seat 12 for the second bayonet portion 21 is formed on a housing of the compressor 10. The cylindrical seat 12 projects into the housing of the compressor 10 or is formed by a depression of the housing, as can be seen in FIG. 2. The second bayonet portion 21 is formed by a neck of the sealing liquid container 20. The sealing liquid container 20 can in this respect also be referred to as a sealing liquid bottle with a bottle neck, which forms the second bayonet portion 21.

As can also be seen in FIG. 2, a first bayonet portion 11 is formed within the cylindrical seat 12, on the compressor 10 or its housing. The first bayonet portion 11 is designed in the form of a cylindrical receptacle for the second bayonet portion 21 so that the second bayonet portion 21 is plugged onto the first bayonet portion 11 within the scope of the first step or the plugging movement. Within the scope of the second step or the rotating movement in the arrow direction shown in FIG. 1, the aforementioned bayonet lock is then formed between the first bayonet portion 11 and the second bayonet portion 21. The first bayonet portion 11 has an air outlet port 19 for discharging the compressed air. The second bayonet portion 21 in turn has an air inlet port 29 (see FIG. 5) for receiving the compressed air. When the bayonet lock is formed or when the first bayonet portion 11 is coupled to the second bayonet portion 21 by means of a plugging movement and a rotating movement, the air outlet port 19 and the air inlet port 29 are connected to one another.

Figure 3:
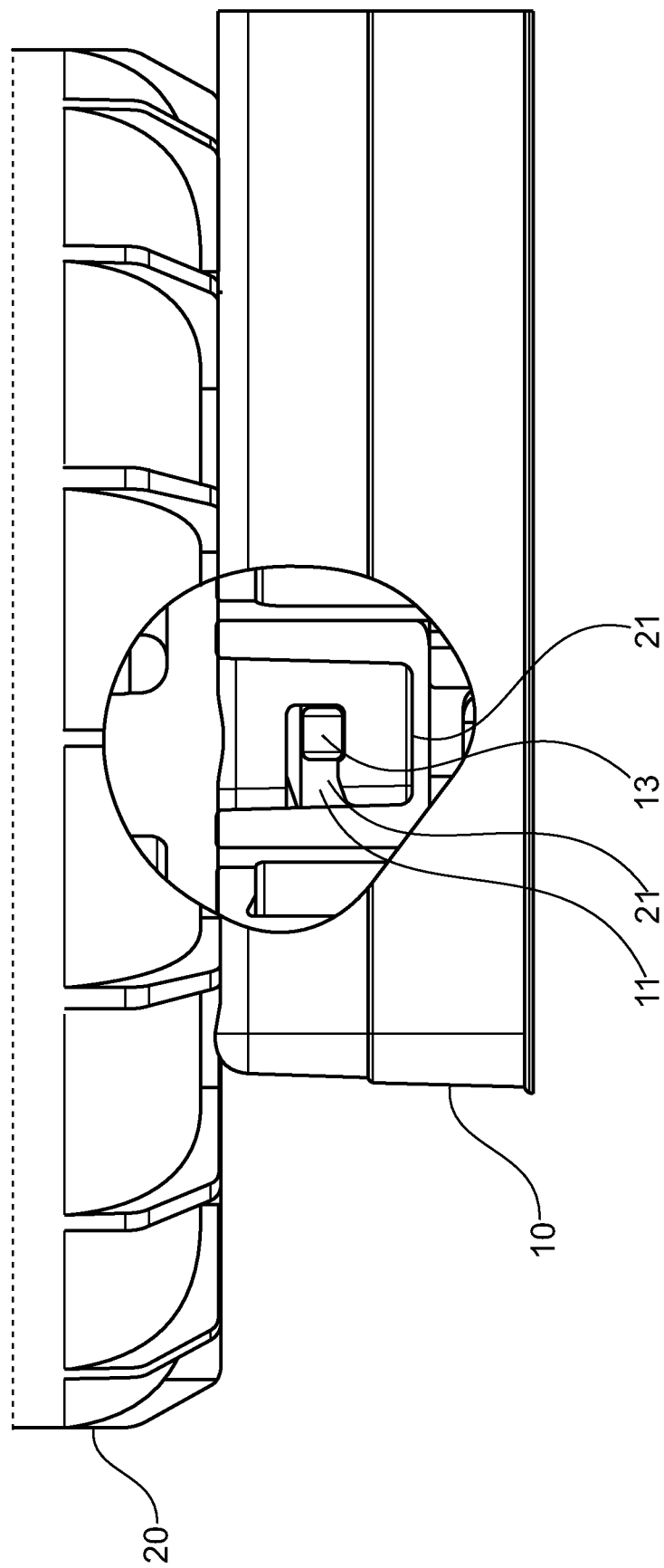
FIG. 3 shows part of the device of FIG. 1 in a sectioned view of a bayonet lock formed between the compressor and the sealing liquid container, for coupling them to one another.
Figure 4:
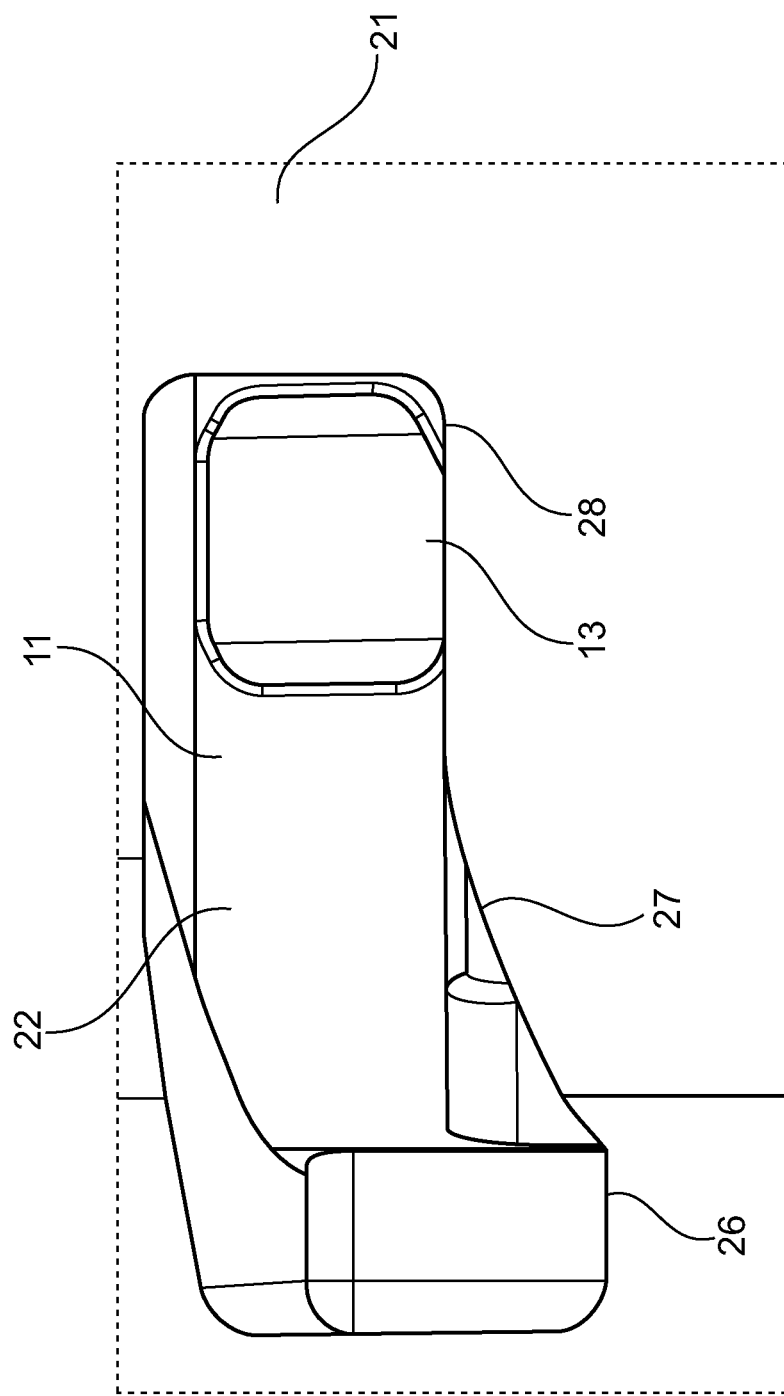
FIG. 4 shows a detailed view of the bayonet lock.

As shown in FIGS. 3 and 4, the first bayonet portion 11 in turn has radially projecting bayonet elements 13. In the present case, two bayonet elements 13.1, 13.2 are located opposite one another (see FIG. 7). They substantially form the bayonet lock in that they engage in first recesses 22.1, 22.2 (see FIG. 5) of the second bayonet portion 21 in the second step or the rotating movement and are guided there.

Figure 5:
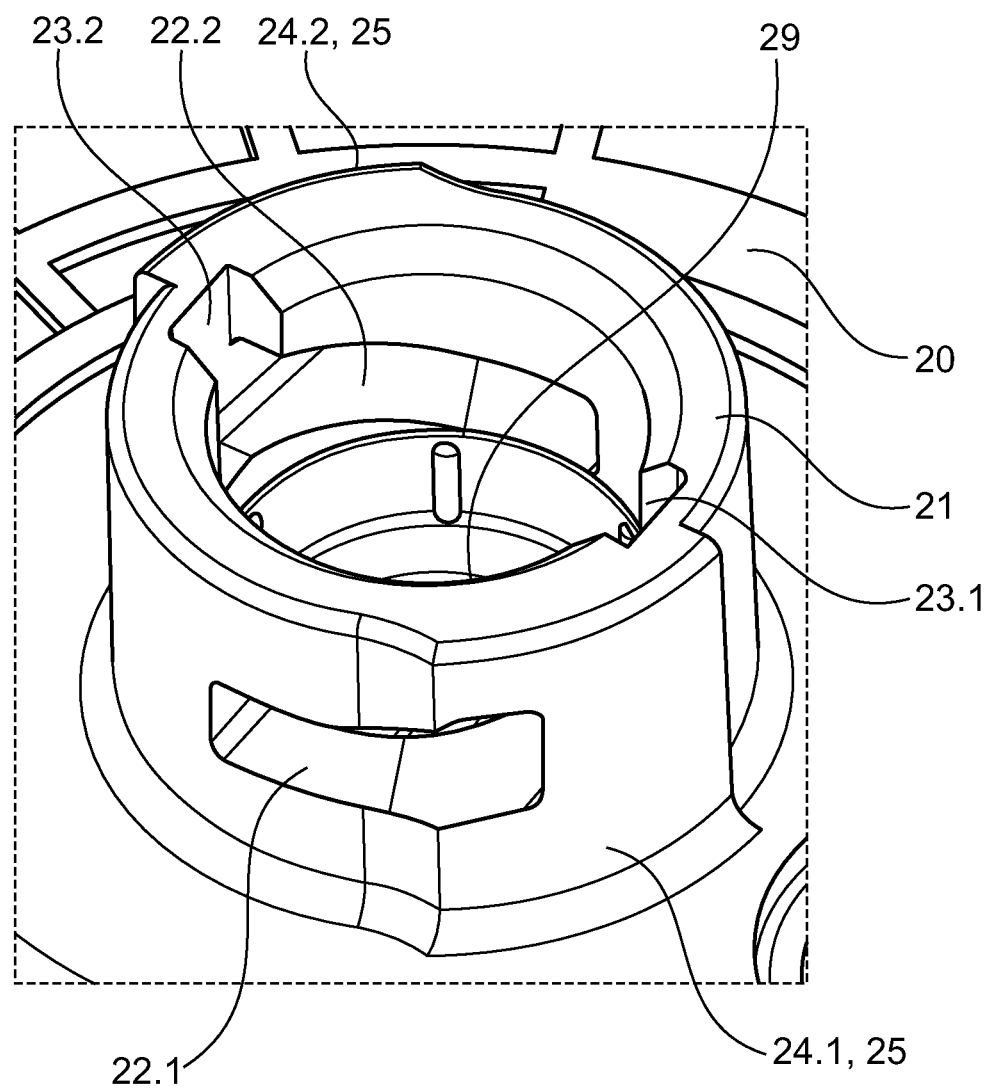
FIG. 5 shows a detailed view of a second bayonet portion of the bayonet lock, which is formed on the sealing liquid container.

As can be seen in FIG. 5, in the first step or the plugging movement, the bayonet elements 13.1, 13.2 pass through the second recesses 23.1, 23.2, which are designed as grooves and run in the longitudinal direction of the second bayonet portion 21, into the first recesses 22.1, 22.2, which are designed as elongated holes in the present case. By means of the second step for the formation of the bayonet lock or by means of the rotating movement in the arrow direction, the bayonet elements 13.1, 13.2 are now rotated relative to the second bayonet portion 21. The bayonet elements 13.1, 13.2 are thereby guided in the first recesses 22.1, 22.1.

As can be seen in FIG. 5 and in particular in FIG. 4, the bayonet elements 13.1, 13.2 must overcome a ramp or a ramp-shaped profile 27 in the circumferential direction of the cylindrical second bayonet portion 21. The ramp-shaped profile 27 is designed to be stepless from a receiving portion 26 of the second bayonet portion 21, into which the bayonet elements 13.1, 13.2 pass from the first recesses 23.1, 23.2, to a third clamping portion 28 of the second bayonet portion 21. The third clamping portion 28 clamps the bayonet elements 13.1, 13.2 in the first recesses 22.1, 22.2 in order to prevent an unintentional release of the thereby produced bayonet lock during operation of the device 1.

The bayonet elements 13.1, 13.2 have rounded edges on all sides, as can be seen, for example, in FIG. 4. The clamping surfaces of the third clamping portion 28, which come into contact with the bayonet elements 13.1, 13.2, can be formed with an increased roughness, in particular with at least a mean roughness value of Ra8 or Ra9, in order to further increase the necessary torque in the direction opposite to the arrow direction shown in FIG. 1, for the rotating movement that releases the bayonet lock.

Figure 6:
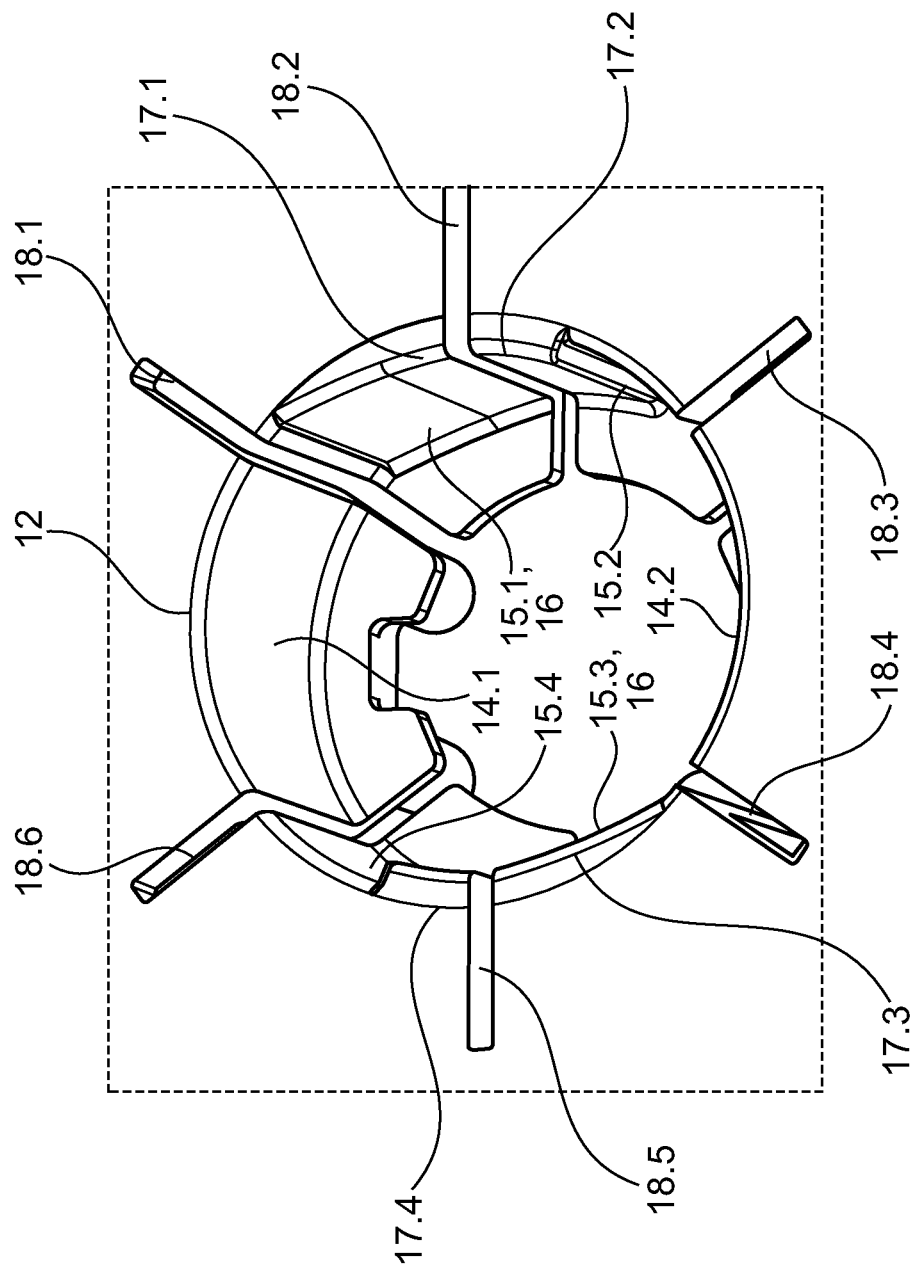
FIG. 6 shows a detailed view of a cylindrical seat of the bayonet portion of the bayonet lock, which is formed on the sealing liquid container.

FIG. 6 shows the cylindrical seat 12 in detail. The cylindrical seat 12 consists of multiple walls 14.1, 14.2, 15.1, 15.2, 15.3, 15.4, which are each separated from one another by slots 18.1, 18.2, 18.3, 18.4, 18.5, 18.6, so that the walls 14.1, 14.2, 15.1, 15.2, 15.3, 15.4 are arranged at least partially flexibly movably relative to the housing of the compressor 10 or on the housing of the compressor 10. The number of walls 14.1, 14.2, 15.1, 15.2, 15.3, 15.4 can of course vary in comparison to the number shown in FIG. 6. The wall thicknesses of the second walls 14.1, 14.2 or walls of the second type 14.1, 14.2 are dimensioned such that they do not come into contact with a second clamping portion 25 (see FIG. 5) of the second bayonet portion 21. In other words, the second walls 14.1, 14.2 have a clear distance from one another that is greater than the diameter of the second bayonet portion 21 in the region of the second clamping portion 25. In the present case, the second clamping portion is formed by two opposing radial projections 24.1, 24.2 of the second bayonet portion 21. The projections 24.1, 24.2 extend radially outward from the remaining cylindrical form of the second bayonet portion 21. After the first step or the plugging movement into the cylindrical seat 12 has been performed, the projections 24.1, 24.2 thus extend to the walls 14.1, 14.2, 15.1, 15.2, 15.3, 15.4.

Since the second walls 14.1, 14.2 do not contact the second clamping portion 25 during the plugging movement of the sealing liquid container 20 into the cylindrical seat 12, the plugging movement can be carried out unhindered. Plugging in the sealing liquid container 20 in such a way that the radial projections 24.1, 24.2 are opposite the second walls 14.1, 14.2 is also the intended orientation of the second bayonet portion 21 relative to the cylindrical seat 12 since the first walls 15.1, 15.2, 15.3, 15.4 have bulges 17.1, 17.2, 17.3, 17.4 or increased material thicknesses relative to the second walls 14.1, 14.2. These bulges 17.1, 17.2, 17.3, 17.4 increase in the arrow direction of the rotating movement in a ramp-like manner. The bulges 17.1, 17.2, 17.3, 17.4 or their ramp-like increases extend in each case over two of the first walls 15.1, 15.2, 15.3, 15.4, as can be seen in FIG. 6. By means of the orientation of the first bayonet portion 11 within the cylindrical seat 12, the bulges 17.1, 17.2, 17.3, 17.4 of the first walls 15.1, 15.2, 15.3, 15.4 and the bayonet elements 13.1, 13.2 prevent the second bayonet portion 21 from being plugged into the cylindrical seat 12 in such a way that the first clamping portion 25 comes to engage with the second clamping portion 16 as a result of the plugging movement. In other words, the clear distance between the opposing first walls 15.1, 15.2, 15.3, 15.4 is smaller than the diameter of the second bayonet portion 21 in the region of the second clamping portion 25.

The bayonet lock is produced by the two aforementioned steps of plugging movement and rotating movement. After the plugging movement, the sealing liquid container 20 is rotated in the arrow direction so that the ramp-like increasing bulges 17.1, 17.2, 17.3, 17.4 bear against the projections 24.1, 24.2 in a clamping manner or with a clamping force. For applying the clamping force by the compressor 10 or the second walls 15.1, 15.2, 15.3, 15.4, corresponding stiffening elements, for example in the form of stiffening ribs, can be provided on the rear side of the second walls 15.1, 15.2, 15.3, 15.4 and engage in the housing of the compressor 10.

Figure 7:
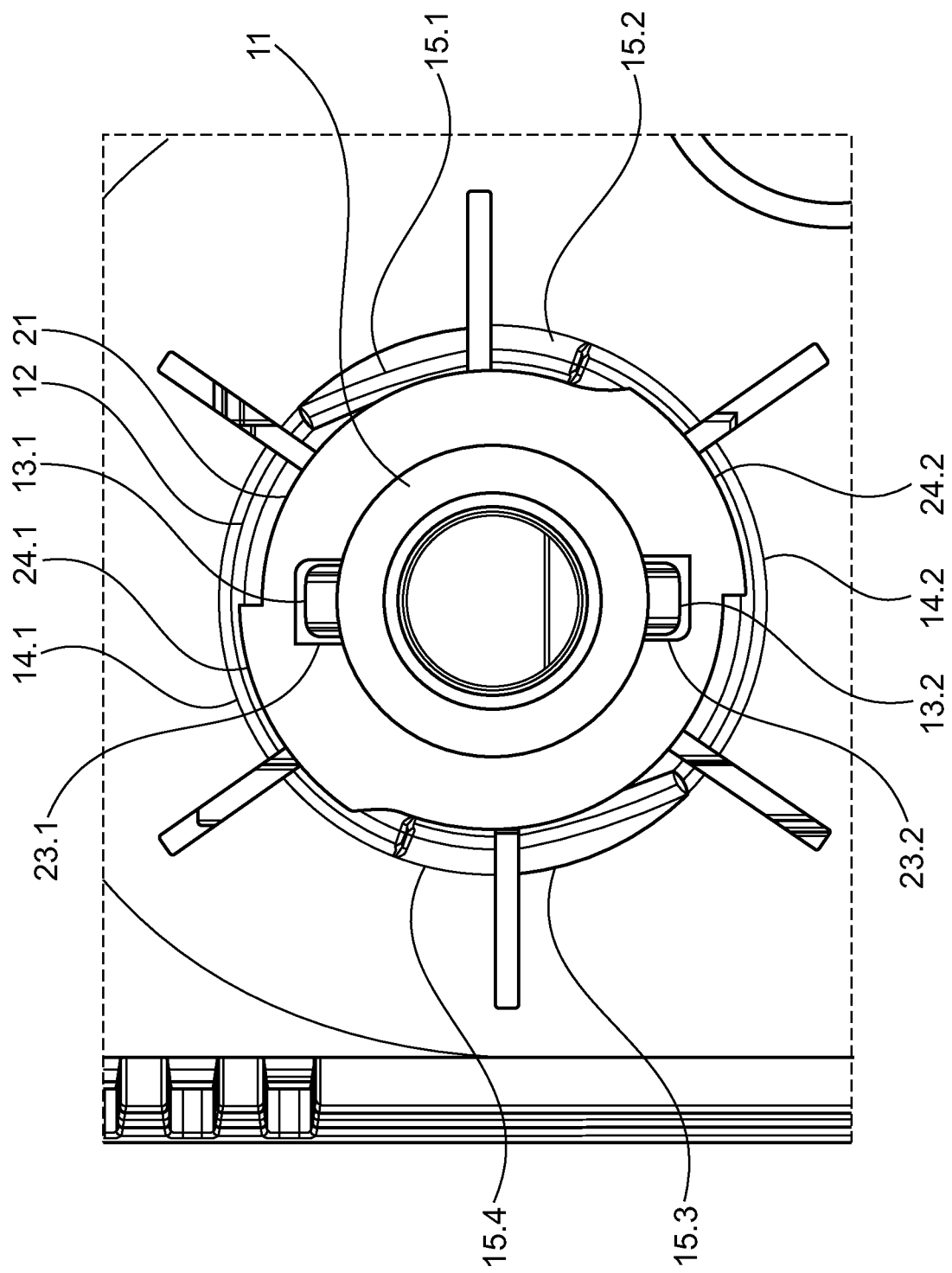
FIG. 7 shows a detailed view of a first step for forming the bayonet lock of FIG. 5.

FIG. 7 now shows the already explained first step of the plugging movement or the end position of the two bayonet portions 11, 21 relative to one another after the plugging movement has been carried out. In this case, the radial projections 24.1, 24.2, which form the second clamping portion 25, are located opposite the second walls 14.1, 14.2 and the bayonet elements 13.1, 13.2 extend through the second recesses 23.1, 23.2 so that they are received in the first recesses 22.1, 22.2 (not visible here).

Figure 8:
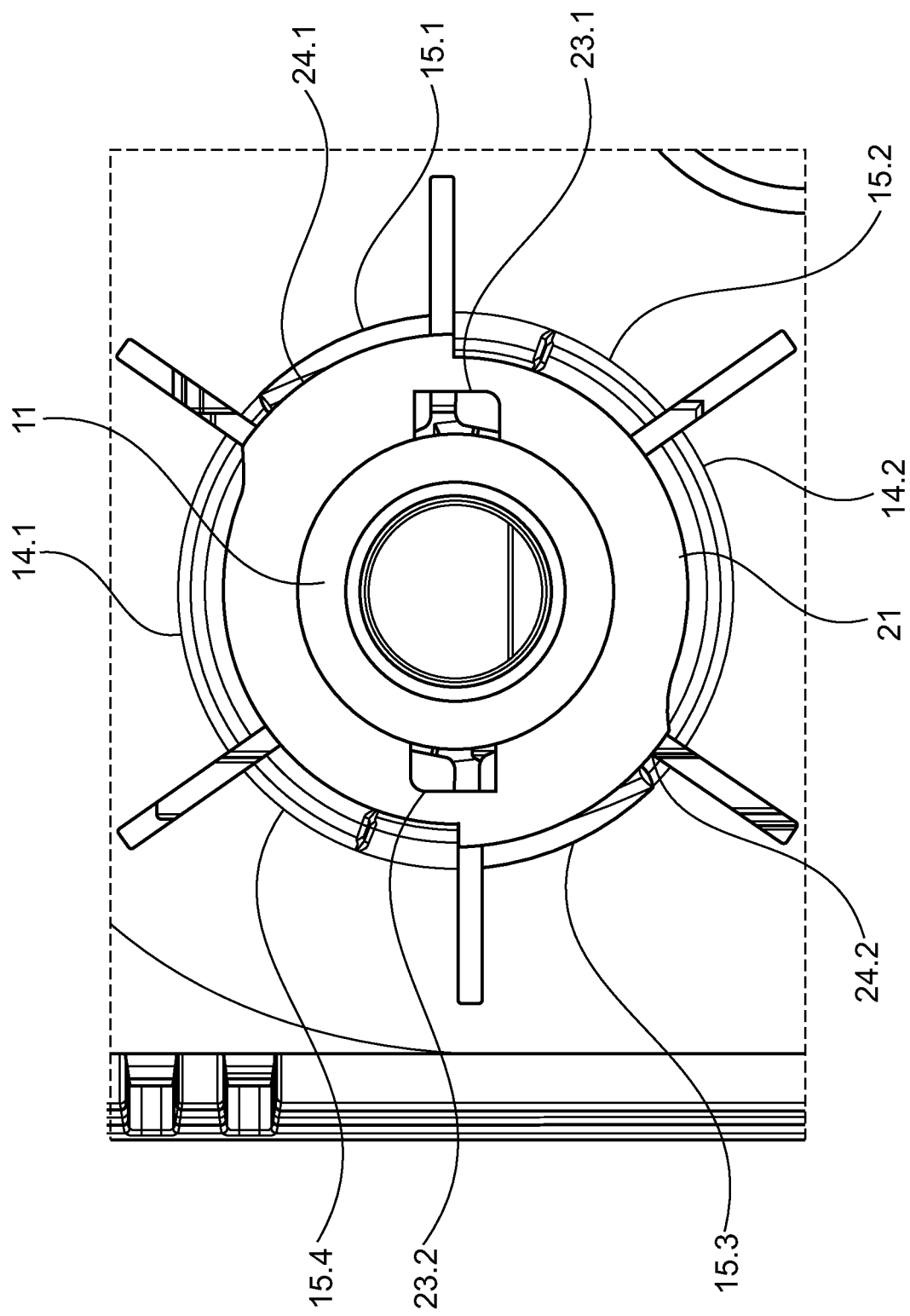
FIG. 8 shows a detailed view of a second step for forming the bayonet lock of FIG. 5.

FIG. 8 shows the already explained second step of the rotating movement or the end position of the two bayonet portions 11, 21 in the formed bayonet lock after the rotating movement has been carried out following the plugging movement. In this case, the first clamping portion 16 is clamped against the second clamping portion 25 since the projections 24.1, 24.2 have been rotated against the ramp-like increasing bulges 17.1, 17.2, 17.3, 17.4 of the first walls 15.1, 15.2, 15.3, 15.4 by means of the torque applied during the rotating movement. Since the clear distance between the opposing first walls 15.1, 15.2, 15.3, 15.4 is smaller than the diameter of the second bayonet portion 21 in the region of the second clamping portion 25 due to the bulges 17.1, 17.2, 17.3, 17.4, and optionally due to the stiffening elements which press the first walls 15.1, 15.2, 15.3, 15.4 toward the second bayonet portion 21, the desired clamping force of the first walls 15.1, 15.2, 15.3, 15.4 is achieved.

The invention claimed is:

1. A compressor for a device for sealing pneumatic tires by means of a sealing liquid, wherein the compressor comprises:
    a first bayonet portion with an air outlet port;
    a second bayonet portion, the first bayonet portion is adapted to be coupled to the second bayonet portion with an air inlet port of a sealing liquid container of the device so that the first bayonet portion and the second bayonet portion form a bayonet lock and the air inlet port is connected to the air outlet port,
    wherein the compressor has a first clamping portion, which is adapted to clamp the second bayonet portion in the bayonet lock,
    wherein the first clamping portion is formed by two opposing first walls, which are configured such that the second bayonet portion is clamped between the two opposing first walls in the bayonet lock,
    wherein the two opposing first walls are separated from one another by second walls and do not clamp the second bayonet portion in the bayonet lock, and
    wherein two of the opposing first walls and two of the second walls are each separated from one another by slots.

2. The compressor according to claim 1, wherein the first clamping portion is configured to radially clamp the second bayonet portion in the bayonet lock.

3. The compressor according to claim 1, wherein the first clamping portion is formed on a cylindrical seat within the compressor.

4. The compressor according to claim 1, wherein the first bayonet portion is configured as a cylindrical receptacle of the second bayonet portion and with radially projecting bayonet elements.

5. A device for sealing pneumatic tires by a sealing liquid, wherein the device comprises the compressor according to claim 1 and the sealing liquid container with the second bayonet portion.

6. The device according to claim 5, wherein the first bayonet portion and the second bayonet portion form the bayonet lock, the air inlet port is connected to the air outlet port, and the first clamping portion clamps the second bayonet portion in the bayonet lock.

7. The device according to claim 5, wherein the second bayonet portion has a second clamping portion corresponding to the first clamping portion, which second clamping portion is formed by at least one radial projection of the second bayonet portion.

8. The device according to claim 5, wherein the second bayonet portion is formed by a cylindrical neck of the sealing liquid container with first recesses running in a circumferential direction of the neck and second recesses running in a longitudinal direction of the neck.

9. The device according to claim 8, wherein the first recesses are configured as elongated holes and/or the second recesses are configured as grooves.

10. A device for sealing pneumatic tires by a sealing liquid, wherein the device comprises:
   a compressor including:
      a first bayonet portion with an air outlet;
      a second bayonet portion, the first bayonet portion is configured to be coupled to the second bayonet portion with an air inlet port of a sealing liquid container of the device so that the first bayonet portion and the second bayonet portion form a bayonet lock and the air inlet port is connected to the air outlet port,
   wherein the compressor has a first clamping portion, which is configured to clamp the second bayonet portion in the bayonet lock,
   wherein the second bayonet portion is formed by a cylindrical neck of the sealing liquid container with first recesses running in a circumferential direction of the neck and second recesses running in a longitudinal direction of the neck,
   wherein the first recesses have a ramp-shaped profile along the circumferential direction from a receiving portion of the second bayonet portion for receiving the bayonet elements to a third clamping portion of the second bayonet portion for clamping the bayonet elements in the first recesses.

11. The device according to claim 10, wherein the third clamping portion has surfaces of increased roughness with at least a mean roughness value of Ra8 or Ra9, which clamp the bayonet elements.

12. The device according to claim 10, wherein the ramp-shaped profile from the receiving portion to the third clamping portion is stepless.

* * * * *